(12) United States Patent
Shipman

(10) Patent No.: US 7,193,535 B2
(45) Date of Patent: Mar. 20, 2007

(54) ILLUMINATED KEYBOARD

(76) Inventor: Michael Shipman, 1614 Via Tulipan, San Clemente, CA (US) 92673

( * ) Notice: Subject to any disclaimer, the term of this patent is extended or adjusted under 35 U.S.C. 154(b) by 341 days.

(21) Appl. No.: 10/983,291

(22) Filed: Nov. 5, 2004

(65) Prior Publication Data

US 2005/0068202 A1    Mar. 31, 2005

Related U.S. Application Data

(63) Continuation-in-part of application No. 10/294,396, filed on Nov. 14, 2002, now Pat. No. 6,918,677, which is a continuation-in-part of application No. 09/899,960, filed on Jul. 6, 2001, now abandoned, which is a continuation-in-part of application No. 09/836,628, filed on Apr. 16, 2001, now Pat. No. 6,467,924, which is a continuation-in-part of application No. 09/500,735, filed on Feb. 9, 2000, now Pat. No. 6,217,183, which is a continuation of application No. 09/396,141, filed on Sep. 15, 1999, now abandoned.

(51) Int. Cl.
*H03K 17/94* (2006.01)
*G01D 11/28* (2006.01)

(52) U.S. Cl. .......................... 341/31; 362/30
(58) Field of Classification Search ............... 362/85, 362/26, 30, 87; 341/31, 200, 340, 400, 708; 400/711

See application file for complete search history.

(56) References Cited

U.S. PATENT DOCUMENTS

| | | | |
|---|---|---|---|
| 3,886,544 A | 5/1975 | Narodny | 340/365 P |
| 3,934,245 A | 1/1976 | Mueller | 340/324 R |
| 4,060,703 A | 11/1977 | Everett, Jr. | 200/5 A |
| 4,124,879 A | 11/1978 | Schoemer | 362/26 |
| 4,177,501 A | 12/1979 | Karlin | 362/26 |
| 4,320,268 A | 3/1982 | Brown | 200/5 A |
| 4,449,024 A | 5/1984 | Stracener | 200/317 |
| 4,489,227 A | 12/1984 | Lamarche | 200/314 |
| 4,670,633 A | 6/1987 | Kaiwa et al. | 200/314 |

(Continued)

FOREIGN PATENT DOCUMENTS

EP    1 329 919 A1    7/2003

(Continued)

OTHER PUBLICATIONS

Chan et al.: U.S. Appl No. 60/108,310, filed Nov. 13, 1998; which later matured into US Patent No. 6,322,229.*

*Primary Examiner*—Daniel Swerdlow
*Assistant Examiner*—Sigmund Tang
(74) *Attorney, Agent, or Firm*—Drummond & Duckworth

(57) ABSTRACT

A keyboard is provided having illuminating keys. The keyboard includes a light channeling membrane and key members constructed at least partially of translucent material so that light produced from a light source is channeled upwardly to the upper surfaces of the key members. The light source may include LED or LEC systems in adjoining relationship to the light channeling membrane or light pipe. In a preferred embodiment, the light source is constructed of a substantially planar illuminescent sheet which underlies the light channeling membrane. In an alternative preferred embodiment, a light pipe is constructed to illuminate light laterally along a portion of its length to illuminate a plurality of key members.

5 Claims, 9 Drawing Sheets

U.S. PATENT DOCUMENTS

| | | | |
|---|---|---|---|
| 4,727,357 A | 2/1988 | Curtin et al. | 340/365 P |
| 4,806,908 A | 2/1989 | Krupnik | 341/22 |
| 4,811,175 A | 3/1989 | DeSmet | 362/95 |
| D311,913 S | 11/1990 | Schaum | D14/114 |
| 5,029,046 A | 7/1991 | Kameda | 362/28 |
| 5,034,602 A | 7/1991 | Garcia, Jr. et al. | 250/227.22 |
| 5,045,755 A | 9/1991 | Appelberg | 313/498 |
| 5,097,396 A | 3/1992 | Myers | 362/32 |
| 5,384,459 A | 1/1995 | Patino et al. | 250/229 |
| 5,432,684 A | 7/1995 | Fye et al. | 362/30 |
| 5,491,313 A | 2/1996 | Bartley et al. | 200/310 |
| 5,510,782 A | 4/1996 | Norris et al. | 341/22 |
| 5,512,718 A | 4/1996 | Larose | 200/314 |
| 5,542,016 A | 7/1996 | Kaschke | 385/123 |
| 5,684,513 A | 11/1997 | Decker | 345/168 |
| 5,747,756 A | 5/1998 | Boedecker | 200/5 A |
| 5,797,482 A | 8/1998 | LaPointe et al. | 200/314 |
| 5,807,002 A | 9/1998 | Tsai | 400/494 |
| 5,815,225 A | 9/1998 | Nelson | 349/665 |
| 5,871,088 A | 2/1999 | Tanabe | 200/514 |
| 5,899,553 A | 5/1999 | Howell | 362/84 |
| 5,975,711 A | 11/1999 | Parker et al. | 362/24 |
| 5,993,019 A | 11/1999 | Kline et al. | 362/29 |
| 6,006,118 A | 12/1999 | Stephenson | 455/575 |
| 6,040,822 A | 3/2000 | Decker | 345/168 |
| 6,179,432 B1 | 1/2001 | Zhang et al. | 362/84 |
| 6,199,996 B1 | 3/2001 | Katrinecz, Jr. et al. | 362/85 |
| 6,270,229 B1 | 8/2001 | Chien | 362/84 |
| 6,284,988 B1 | 9/2001 | Watanabe et al. | 200/5 A |
| 6,322,229 B1 | 11/2001 | Chan et al. | 362/85 |
| 6,448,520 B1 | 9/2002 | Inoue | 200/344 |
| 6,554,442 B2 | 4/2003 | Chou | 362/85 |
| 6,590,508 B1 | 7/2003 | Howell et al. | 341/22 |
| 6,609,805 B1 | 8/2003 | Nelson | 362/30 |
| D484,511 S | 12/2003 | Registre | D14/455 |
| 6,677,931 B2 | 1/2004 | Chi et al. | 345/170 |
| 6,686,549 B2 | 2/2004 | Douzono et al. | 200/341 |
| 6,704,004 B1 | 3/2004 | Ostergard et al. | 345/170 |
| D491,562 S | 6/2004 | Chou | D14/396 |
| 6,773,128 B2 | 8/2004 | Katrinecz, Jr. et al. | 362/84 |
| 6,797,902 B2 | 9/2004 | Farage et al. | 200/314 |
| 6,803,903 B1 | 10/2004 | Ostergard et al. | 345/168 |
| 2001/0002166 A1 | 5/2001 | Katrinecz, Jr. et al. | 362/84 |

FOREIGN PATENT DOCUMENTS

| | | |
|---|---|---|
| EP | 1 028 443 B1 | 8/2003 |
| JP | 2000-299032 | 10/2000 |
| WO | WO 98/48394 | 10/1998 |

* cited by examiner

ILLUMINATED KEYBOARD

RELATED APPLICATIONS

This application is a continuation-in-part application of U.S. patent application Ser. No. 10/294,396 filed on Nov. 14, 2002, now U.S. Pat. No. 6,918,677 which in turn is a continuation-in-part application of U.S. patent application Ser. No. 09/899,960 filed on Jul. 6, 2001, now abandoned, which in turn is a continuation-in-part application of U.S. patent application Ser. No. 09/836,628 filed on Apr. 16, 2001, now U.S. Pat. No. 6,467,924 issued Oct. 22, 2002, which in turn is a continuation-in-part application of U.S. patent application Ser. No. 09/500,735, filed on Feb. 9, 2000, now U.S. Pat. No. 6,217,183 issued Apr. 17, 2001, which in turn is a continuation application of U.S. patent application Ser. No. 09/396,141, filed on Sep. 15, 1999, now abandoned.

BACKGROUND OF THE INVENTION

The present invention relates generally to keyboards, including typewriter and computer keyboards.

More specifically, the present invention relates to keyboards having illuminated key members.

Conventional keyboards include a plurality of key members which display symbols, such as alphanumeric keys, on their top surfaces. Moreover, typical modern keyboards for both electric typewriters and computers utilize a make-and-break electrical circuit which is activated by depression of a key member for identifying a particular symbol embedded on the top of the key member.

A problem with prior art keyboards is that it is often difficult to discern the symbol appearing on the top of the key member under poor lighting conditions. This causes the keyboard operator to memorize the key locations or to strain their eyes to operate the keys of the keyboard under low light conditions. This has become a much greater problem in present day society as keyboards have become necessary for everyday use and as keyboard use is not limited primarily to operation by workers in business offices as in the past. As a result of this expansion of keyboard use, more and more operators have less training on keyboards, and correspondingly many keyboard operators utilize a "hunt and peck" style of keyboard operation.

Moreover, the advent of laptop and notebook computers has resulted in the use of keyboards at places where they were not previously operated. Often these places provide limited light making it difficult for keyboard operators to quickly and easily operate the keyboard. For example, it is a common sight on commercial aircraft to see a passenger slowly hunt and peck at their keyboards continuously looking at the key members to verify that they are in fact pressing the correct keys.

Accordingly, it is clear that there is a need for an apparatus that makes keyboard key members more discernable in low light conditions. Backlighting is commonly used in rubber keypads, membrane switches, rigid panels and the like to make them more visible and discernable. These keypad panels typically make use of light emitting crystals (LECs), light emitting diodes (LEDs), and/or fiberoptics for this purpose. Most prior backlit keyboards utilize a light source which is typically transmitted via a fiberoptic cable to the key members of a keypad. For example, U.S. Pat. No. 5,034,602 issued to Garcia, Jr. et al. discloses an optically activated keyboard which uses fiberoptic cables to transmit light to translucent key members. The light is transmitted through the translucent key members where it is emitted from the top of the key cap. Similarly, U.S. Pat. No. 3,886,544 issued to Narodny and U.S. Pat. No. 5,097,396 issued to Myers disclose keyboards which use backlighting. Each key member in connection to a fiberoptic cable which transmits light to a respective key member which thereafter transmits light from the top of the key cap. Additional keyboard and keypad techniques include the LED and LEC backlighting commonly utilized for alarm activator and deactivator keypads wherein each key includes a separate LED or LEC structure embedded in or behind the key member. Unfortunately, it is extremely difficult to route fiberoptics to the keyboard keys of today's computer systems. For example, it would be particularly difficult to route fiberoptic cables and provide a light source to the key members of today's notebook computers and palm-sized computer systems.

In addition, the light sources for use with prior art backlit keyboards require substantial power and in some cases, a fan for cooling which draws additional power. These constructions are prohibitive for portable computers such as laptop and notebook computers which draw on the power of a rechargeable battery and where power is at a premium.

Accordingly, it would be highly advantageous to provide a keyboard having illuminated key members suitable for use with today's computer systems including portable computers.

It would also be highly advantageous to provide a keyboard having illuminated keys which does not require routing of fiberoptic cables to each key member.

In addition, it would be highly advantageous to provide a keyboard having illuminated key members which is lightweight, simple and inexpensive to manufacture, and requires low power consumption.

SUMMARY OF THE INVENTION

Briefly, in accordance with the invention, I provide an improved keyboard having illuminated indicia and illuminated key members. The improved keyboard includes indicia, a plurality of key members, and, preferably, a light channeling membrane. The indicia, key members, and light channeling membrane are constructed of a substantially translucent material capable of channeling light rays. In addition, the keyboard of the present invention includes a light source optically connected to the light channeling membrane. In operation, the light source produces light rays which are received by the light channeling membrane within the keyboard housing, or is positioned adjacent the indicia or plurality of key members. The light rays are channeled through the light channeling membrane to the indicia or key members which receive the light rays at their lower extremities and which channel the light rays upwardly to their top surface. Light is then emitted from the top of the key member to either provide illumination around an opaque construction of a symbol displayed on the top surface of the key member, or in the alternative, to emit light rays in the shape of the symbol itself, as in the case of keyboard indicia.

In a preferred embodiment, the upper clamshell member of the keyboard's housing acts as a light channeling membrane. The light channeling membrane and plurality of key members are manufactured of acrylic plastic, polycarbonate or glass for optical clarity, though other materials may be used depending on cost, weight and manufacturing limitations as would be understood by those skilled in the art. For this embodiment, the light channeling membrane includes a plurality of bores, with each bore being constructed for receipt of the key shaft of a corresponding key member.

Meanwhile, each key member also includes a key cap having a symbol displayed thereon. Each key member shaft is constructed to extend downwardly and telescopically into a corresponding bore of the light channeling membrane. Light is channeled through the translucent material of the light channeling membrane until it is emitted from cylindrical sidewalls into the membrane's bores. Light emitted from the bores' interior sidewalls is received onto the exterior of the shafts of the key members and channeled upwardly through the translucent material of the shaft, to the key caps which are also constructed of a translucent material. The key cap includes an upper surface having an alphanumeric symbol displayed thereon which is illuminated by light passing through the shaft of the key member to provide the desired illuminated alphanumeric symbol. The symbol can be constructed as light emitting or as opaque with the remainder of the top surface being conversely opaque or light emitting, depending on whether the desired symbol is in either a negative or a positive representation thereof.

In another preferred embodiment of the present invention, the keyboard housing is constructed partially of a substantially translucent material for communicating light rays through said keyboard in the form of indicia, wherein said indicia is discernible when light rays pass there through. The indicia may be an indicator or, for example, correspond to a key member or a group of key members.

The light source may take various forms known to those skilled in the art. For example, the light source may be an incandescent lightbulb, light emitting diode, light emitting crystal, etc. Moreover, the light source may produce light which can be selectively varied in color so as to enable the keyboard operator to alter the color of the luminescence of the key members. For example, the light source may comprise a plurality of diodes with each diode producing different colored light. Selective activation and deactivation of the diodes alone or in combination will produce key members illuminated in different colors.

In another preferred embodiment of the present invention, the light source is connected to a light pipe located within the keyboard housing for channeling light to a plurality of key members. The light pipe, also known as a light guide, may be constructed in various shapes and of various materials such as of lengths of acrylic plastic, polycarbonate, or glass. Alternatively, the light pipe may be constructed of one or more fiberoptic fibers or cables. The light pipes may also be constructed of one or more different translucent and flourescent colored materials for projecting light of one or more colors upon the key members, and for producing alphanumeric characters on the key members of different colors. An acceptable colored material includes "scintillating plastic" which is typically an acrylic plastic incorporating different colored flourescent dyes.

Preferably, the light pipes are constructed to project light laterally from their exteriors. Where the light pipes are comprised of fiberoptic cables, the fiberoptic cables are also constructed to project light laterally from their cylindrical exterior as opposed to predominantly from their distal extremities. This can be accomplished by notching, knurling, scratching or in other manners creating flaws in the otherwise smooth exterior cylindrical surface of the fiberoptic cable. These flaws have been found to interrupt the transmission of light along the length of the fiberoptic cable and to transmit light laterally from the exterior surface of the fiberoptic cable, typically opposite the side which has been flawed. For application with the present invention, a light pipe is routed alongside indicia or a plurality of key members. Light transmitted through the light pipe may be transmitted laterally upon the keyshafts of the key members. The light is then channeled through the key members so as to be emitted from the upper surface of the key members to illuminate a symbol or character.

In an additional preferred embodiment of the present invention, the light source is constructed of a substantially planar sheet underlying the indicia or light channeling membrane of the keyboard. A preferred construction for the illuminating sheet of the light source is described in U.S. Pat. No. 5,045,755 issued to Appelberg and assigned to E-Lite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which can be adhesively attached to the bottom of the keyboard light channeling membrane. Moreover, the illuminating sheet is sufficiently thin as to not require significant modification to existing computer keyboard designs.

An additional preferred construction of the luminescent sheet can be obtained from MKS, Inc. located in Bridgeton, N.J., USA under the trademark designation Quantaflex™. The Quantaflex™ material is an electroluminescent lamp including luminescent phosphors embedded in the dielectric medium of a capacitor constructed in the form of a sheet. Electrodes, including at least one translucent electrode, form the top and bottom layers of the Quantaflex™ material. Upon application of an alternating current to the electrodes, the phosphors give off photons producing light in the visible spectrum. An advantage of the Quantaflex™ material is that the phosphors can be selectively encapsulated between the electrode layers of the luminescent sheet so as to selectively produce patterns of light emitted from the luminescent sheet. For example, for application with the present invention, it is preferred that the Quantaflex™ material be constructed to produce light only below and/or immediately adjacent to the key members so as to reduce power consumption.

In still additional preferred embodiments, the luminescent sheet is constructed of one of the rapidly developing technologies directed to Organic Light Emitting Devices (OLED), Transparent Organic Light Emitting Devices (TOLED), or Flexible Organic Light Emitting Devices (FOLED). Descriptions of these technologies are available to those skilled in the art and will not be described in further detail herein.

In an additional preferred embodiment, the luminescent sheet is constructed of a substantially translucent material, such as an acrylic plastic, polycarbonate, epoxies and glass, connected to an independent light source, such as light emitting diodes, light emitting crystals, etc. For this embodiment, the light channeling luminescent sheet operates as a planar light pipe for channeling light from the light source to the key members.

In still an additional preferred embodiment, the luminescent sheet is constructed of a plurality of fiberoptic cables laid side by side to form a planar sheet. The ends of the cables are positioned adjacent to one or more LEDs or LECs so that emitted light is channeled through the fiberoptic cables. Again, the fiberoptic cables are notched, knurled, scratched or the smooth exterior is otherwise flawed to interrupt the transmission of light along the length of the fiberoptic cables and to transmit light laterally from the exterior surface of the fiberoptic.

Where the keyboard of the present invention utilizes an illuminating sheet for providing light to the key members, the illuminating sheet may be formed with a plurality of holes. The luminescent sheet is then affixed below the light channeling membrane with the holes of the luminescent sheet underlining the bores projecting through the upper clamshell member of the keyboard, which may also function as a light channeling membrane. This construction permits the shafts of the key members to project through the clamshell bores and through the holes of the illuminating sheet. Where the keyboard is constructed for use with a computer, disposed below the illuminating sheet is an elastic diaphragm, for biasing the key members upwardly, and a keyboard circuit board. The circuit board includes a plurality of switches which are closeable upon pressure application such that depression of the key members causes the respective key shafts to project downwardly through the membrane bores and illuminating sheet holes to depress the elastic diaphragm to, in turn, activate the circuit board switches. The closure of a particular circuit board switch results in a corresponding signal being sent to the computer indicating that a particular key member has been depressed.

In an additional embodiment of the present invention, the planar luminescent sheet is disposed between the elastic diaphragm and circuit board. The elastic diaphragm is manufactured of a translucent material so that light emitted upwardly from the luminescent sheet shines upon the bottoms of the key member shafts, and preferably upon the bottom of the upper clamshell member of the keyboard which is also preferably manufactured of a translucent material. For this embodiment, the elastic diaphragm and upper clamshell member cooperate to function as a light channeling membrane to transmit light from the light source to the key members. The light is then channeled through the key members to be transmitted from the tops of their key caps.

In still an additional embodiment of the present invention, the keyboard is constructed with the planar luminescent sheet positioned to underlie the elastic diaphragm and circuit board of the keyboard. The elastic diaphragm and circuit board are manufactured of substantially translucent materials for permitting light emitted from the luminescent sheet to project upwardly through the circuit board and elastic diaphragm to strike the bottom extremities of the key members. It is preferred that the upper clamshell member of the keyboard also be translucent for channeling light rays to the sidewalls of the key member shafts. However, for this embodiment, the elastic diaphragm and circuit board of the keyboard also function as the light channeling membrane. Light emitted from the planar sheet is channeled through the translucent material of the elastic diaphragm and circuit board to the key members. The light is then transmitted through the key members to the key member's upper surface where it is emitted from the top of the key cap in the shape of a character displayed on the key cap.

In a preferred embodiment, it is preferred that the keyboard be constructed or coated with an opaque material in the interstitial regions between the key members so that light does not project upwardly between the key members which would cause visual glare to the keyboard operator or which would otherwise detract from the relative luminescence of the symbols displayed on each of the key members.

Preferably, substantial portions of the keyboard and key members are coated on their exterior surfaces with a reflective opaque coating such as paint or the like where light is not intended to be emitted from their exteriors. More particularly, it is preferred that the key members and upper clamshell member are coated with a reflective paint for reflecting visible light, which would ordinarily be emitted from the key members and upper clamshell member or substantially absorbed by a substantially non-reflective material. Thus, traditional non-reflective paints and coatings such as dark grey, black or blue are preferably avoided. Meanwhile, diffuse reflective coatings such as light grey, white, and silver are preferred, as are coherent reflective coatings such as metallic silver, metallic gold and other shiny metallic colors. Alternative substantially reflective coatings can be selected by those skilled in the art without undue experimentation. In practice, much of the visible light, which would ordinarily be lost, is reflected in either a diffuse or coherent manner back into the upper clamshell member or key members until projected from the tops of the key caps to provide enhanced luminosity of the characters formed on the key caps.

In still an additional preferred embodiment, the key caps and clamshell member include two coatings of paint or the like. The initial first coating utilizes a highly reflective coating, such as appearing light grey, white, silver, and metallic coatings such as silver, gold and other shiny metallic colors, to reduce light absorption and reflect the visible light back into the translucent material until transmitted from the key caps. Meanwhile, a second coating of an alternative paint or other material is applied over the first coating. The second coating may also be reflective. However, it is preferred that the second coating is less reflective of visible light than the first coating, and preferably is a substantially non-reflective dark dull color such as dark grey, black or blue.

It is thus an object of the present invention to provide an inexpensive and simple way to construct a keyboard having illuminating indicia or keys.

It is also an object of the present invention to provide a keyboard having illuminated indicia or key members suitable for use with today's computer systems including portable computers.

Moreover, it is an object of the present invention to provide a keyboard having illuminated indicia or key members which does not require routing of fiberoptic cables to each key member.

These and other and more specific objects and advantages of the invention will be apparent to those skilled in the art from the following detailed description taken in conjunction with the drawings.

DETAILED DESCRIPTION OF PREFERRED EMBODIMENTS

Figure 1:
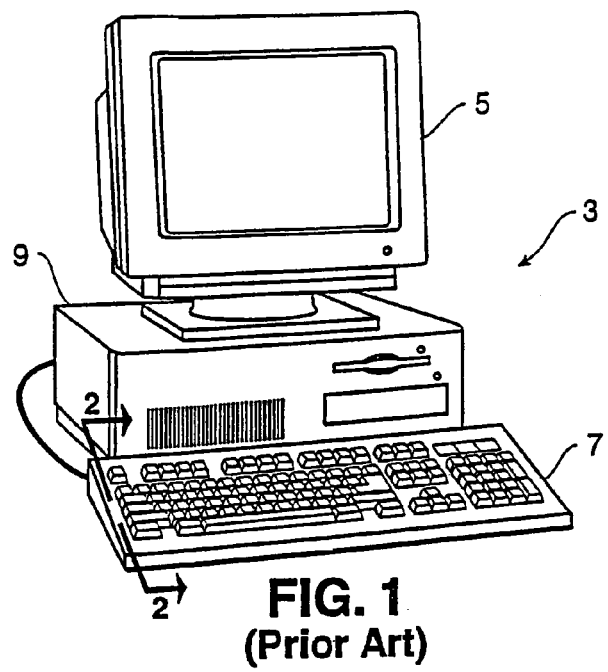
FIG. 1 is a perspective view of a computer including the keyboard of the prior art.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to specific embodiments illustrated.

Figure 2:
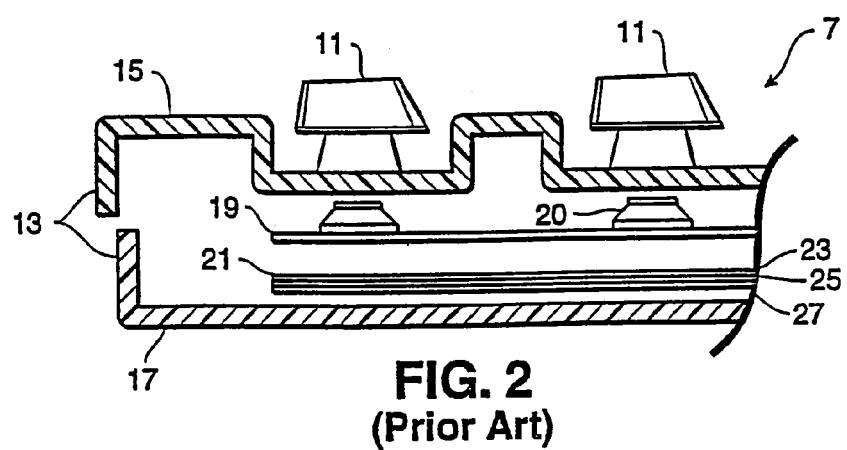
FIG. 2 is a cutaway view of the keyboard shown in FIG. 1.
Figure 3:
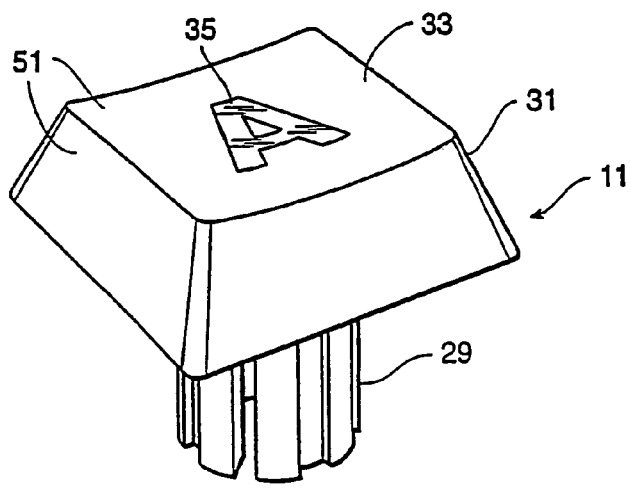
FIG. 3 is a perspective view of a preferred embodiment of a key member for use with the keyboard having illuminated keys of the present invention.

Referring to FIGS. 1–3, keyboards are required to operate numerous apparatus including computers, typewriters and personal organizers, as well as aircraft and vehicular instrument panels. A typical prior art keyboard 7 is shown in FIG. 1 for use with a computer 3. The computer 3 also includes a central processing unit 9 and monitor 5. By pressing key members 11 on the keyboard 7, one sends signals to the central processing unit 9 instructing the computer 3 to perform various functions.

As shown in FIG. 2, a typical keyboard 7 includes a housing 13 comprising an upper clamshell member 15 and lower clamshell member 17. The keyboard 7 further includes a plurality of key members 11 and a diaphragm 19 having elastic diaphragm projections 20 for biasing the key members 11 to a normally upward position. A typical computer keyboard 7 further includes a circuit board 21 which is disposed below the key members 11 and diaphragm 19. The circuit board 21 includes first and second printed wiring layers 23 and 27 which include engraved or embedded electrical circuits. The printed wiring layers 23 and 27 are separated by an insulator or dielectric layer 25. The insulator layer 25 includes a plurality of holes so that depression downwardly of the key members 11 causes the diaphragm projection 20 to be forced downwardly upon the upper printed wiring layer 23 so that the printed wiring layers 23 and 27 can come in contact to open and close distinctive electrical switches through the holes of the insulator layer 25. Each of these electrical switches correspond to different key members 11 so that the keyboard operator can depress key members either individually or in combination to send various signals to the computer's central processing unit 9.

With reference to FIGS. 3–7, a keyboard 1 is provided having illuminated key members 11. Each key member 11 includes a key shaft 29 and a key cap 31. Displayed on the top surface 33 of the key cap 31 is a symbol 35 such as an alphanumeric character. For application of the keyboard 1 of the present invention, the key member 11 is constructed at least partially of a substantially translucent light channeling material so that light can be received by the outer surfaces of the key shaft 29 and channeled upwardly to be emitted from the key cap's upper surface 33. In a first embodiment, light rays are emitted from the symbol 35 itself in which the translucent material portion of the key cap 31 extends through the key shaft 29 and key cap 31 to the key symbol 35. The remaining portion of the key cap's upper surface 33 is constructed of a non-light emitting material or covered by an opaque coating 51 (FIG. 3). In the alternative, the entire key cap 31 including upper surface 33 is constructed of a translucent light emitting material while the symbol 35 is formed of a non-light emitting material, depending whether the symbol 35 is intended to be displayed as a negative or positive representation.

Figure 4:
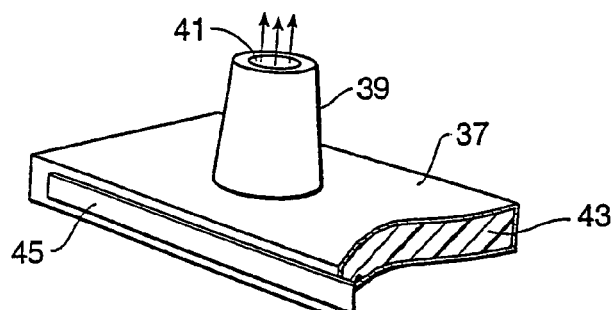
FIG. 4 is a perspective cutaway view of the translucent light channeling membrane for use with the keyboard having illuminated keys of the present invention illustrating a light source as an LED or LEC component.
Figure 5:
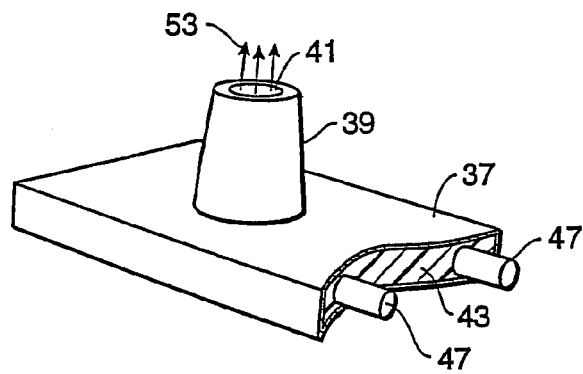
FIG. 5 is a perspective cutaway view of the translucent light channeling membrane for use with the keyboard having illuminated keys of the present invention illustrating a light source as one or more fiberoptic cables embedded in the translucent light channeling membrane.
Figure 6:
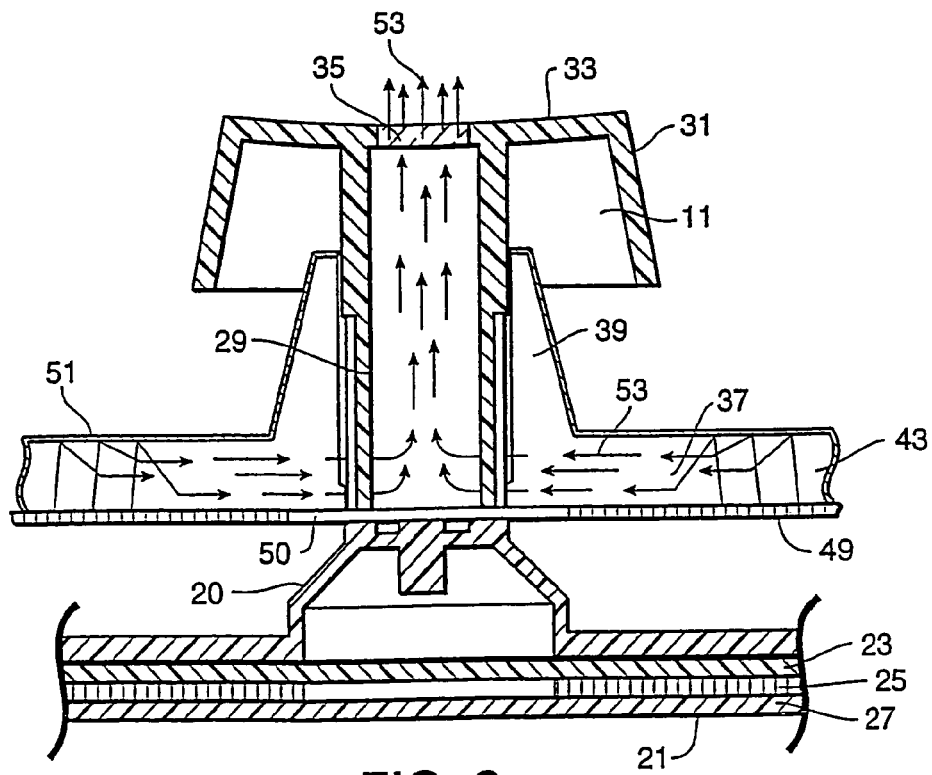
FIG. 6 is a cutaway view of a preferred keyboard having illuminated keys of the present invention wherein the light source is a planar illuminating sheet underlying the light channeling membrane of the keyboard.
Figure 7:
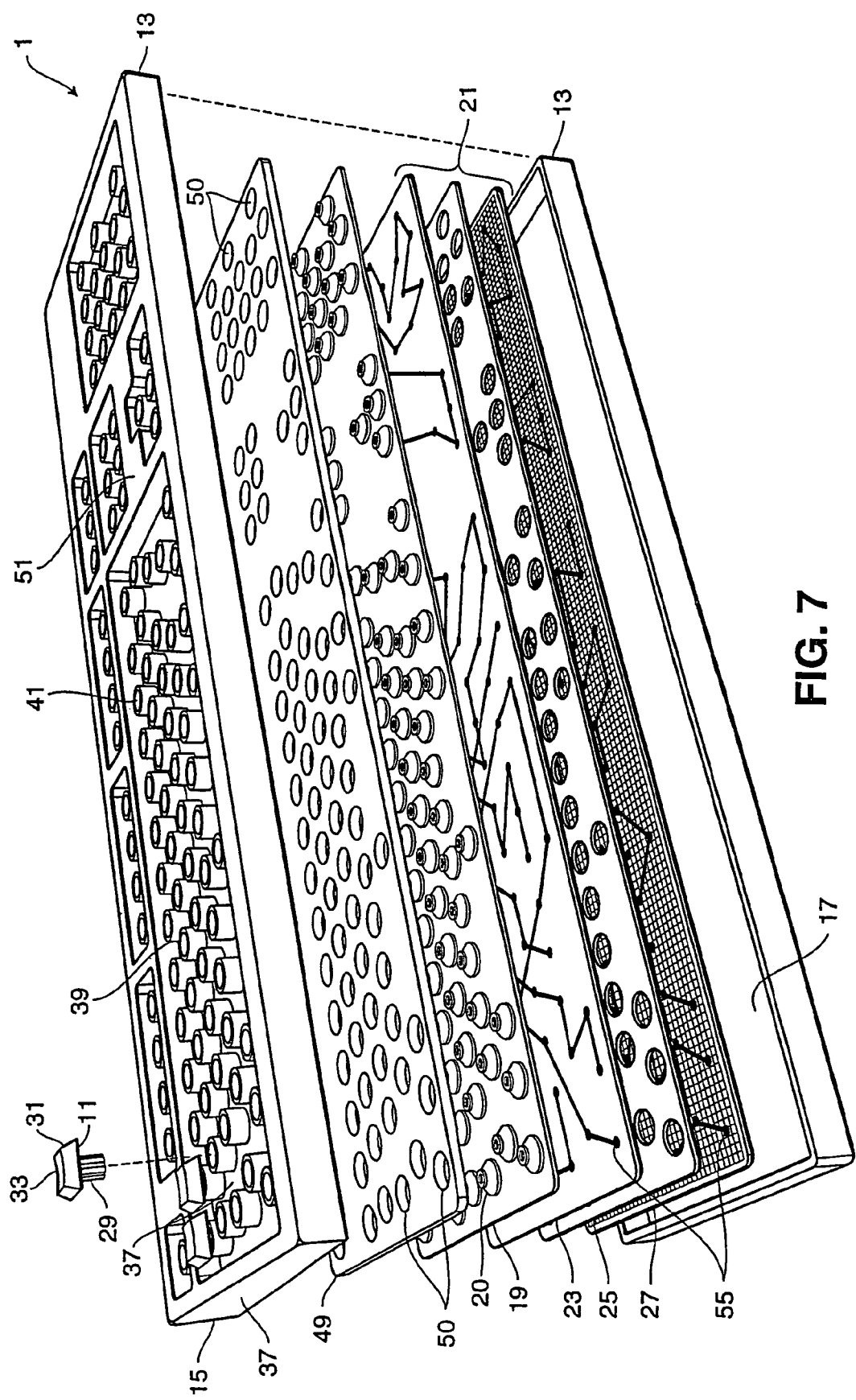
FIG. 7 is an exploded view of the keyboard having illuminated keys of the present invention in which the light source is a planar illuminating sheet underlying the light channeling membrane of the keyboard.

With reference to FIGS. 4–7, preferably, the keyboard 1 of the present invention includes a light channeling membrane 37. The light channeling membrane 37 underlies the key members 11 and is constructed to channel light rays 53 from a light source to the key shafts 29 of the key members 11, which in turn channel the light rays 53 along the length of the key shafts 29 to the key cap's upper surfaces 33. As shown in FIGS. 6 and 7, the light channeling membrane 37 is incorporated into the upper clamshell portion 15 of the keyboard's housing 13. This is accomplished by constructing the upper clamshell member 15 at least partially of a translucent light channeling material. Light rays 53 received upon the light channeling membrane's 37 outer surface are channeled throughout the translucent material to the key members 11. Preferably, the upper surface of the light channeling membrane 37 is coated or otherwise constructed with an opaque coating 51 so that only the upper surfaces 33 of the key members 11 are seen to illuminate by the keyboard operator. As shown in FIGS. 6 and 7, in a preferred embodiment, the light channeling membrane 37 includes a plurality of hollow projections 39 having central longitudinal bores 41 configured for receipt of the key shafts 29 of the key members 11. The hollow projections 39 may project upwardly as shown in FIGS. 4–10, or may project downwardly as shown in FIGS. 11–13, and 15. Preferably, the keyboard 1 also includes a diaphragm 19 having a plurality of elastic projections 20 for biasing the key members 11 upwardly.

In addition to the specially constructed key members 11 and light channeling membrane 37, the keyboard 1 of the present invention includes a light source. The light source may be embedded in, positioned alongside, or positioned underneath the light channeling membrane to communicate light to the light channeling membrane 37. As shown in FIG. 4, in a first embodiment, the light source is comprised of one or more light strips 45 which can be either light emitting diodes (LED) or light emitting crystals (LEC) systems or other constructions known to those skilled in the art which emit light into (as shown in FIG. 5), or upon the exterior side or bottom surfaces of the light channeling membrane 37. With reference to FIGS. 5 and 11–13, in a second embodiment, the light source is connected to one or more light pipes 47, such as fiberoptic cables, which are constructed to project light laterally along their length. In particular, it has been found that fiberoptic cables 47 provide a highly luminescent surface where the curved cylindrical surface has been notched, knurled, scratched or otherwise flawed so that the flaws receive light rays from the interior of the fiberoptic cables 47 and emit those light rays laterally from the fiberoptic cable's exterior surface. For application with the present invention, the light pipes 47 are routed alongside, below or embedded in the upper clamshell member 15, which is preferably at least partially translucent so that light rays 53 channeled from the outer surface of the light pipe 47 is received by the translucent material and channeled within the translucent region 43 to the key members 11.

Figure 11:
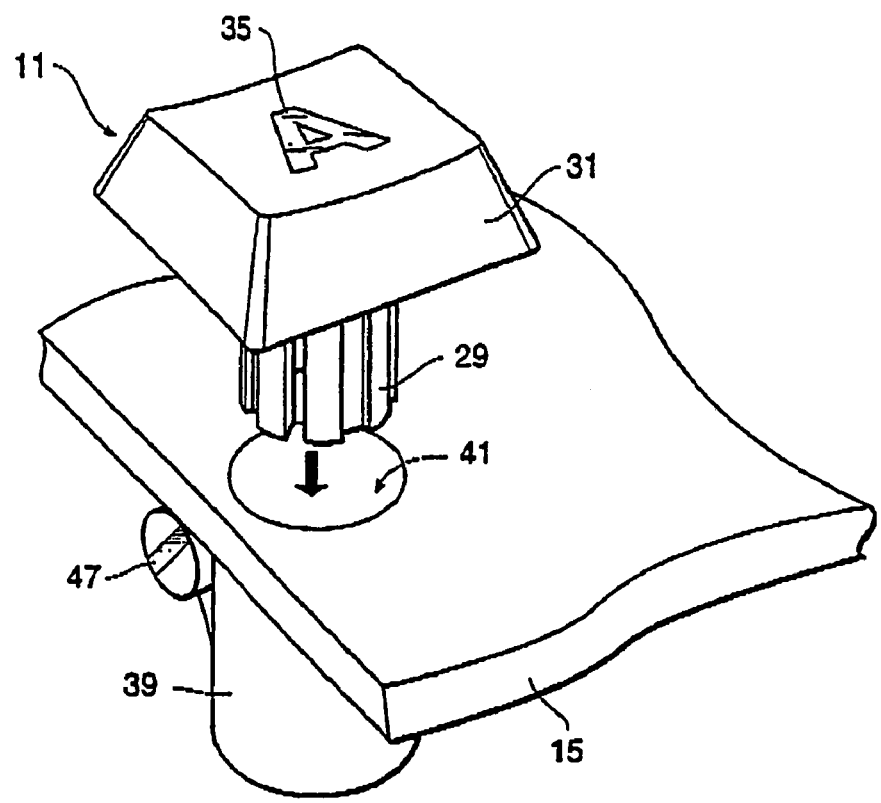
FIG. 11 is a perspective exploded view of a preferred keyboard in which a cylindrical light pipe is positioned adjacent to the clamshell sidewall for transmitting light upon the side of the key shaft of a key member.
Figure 12:
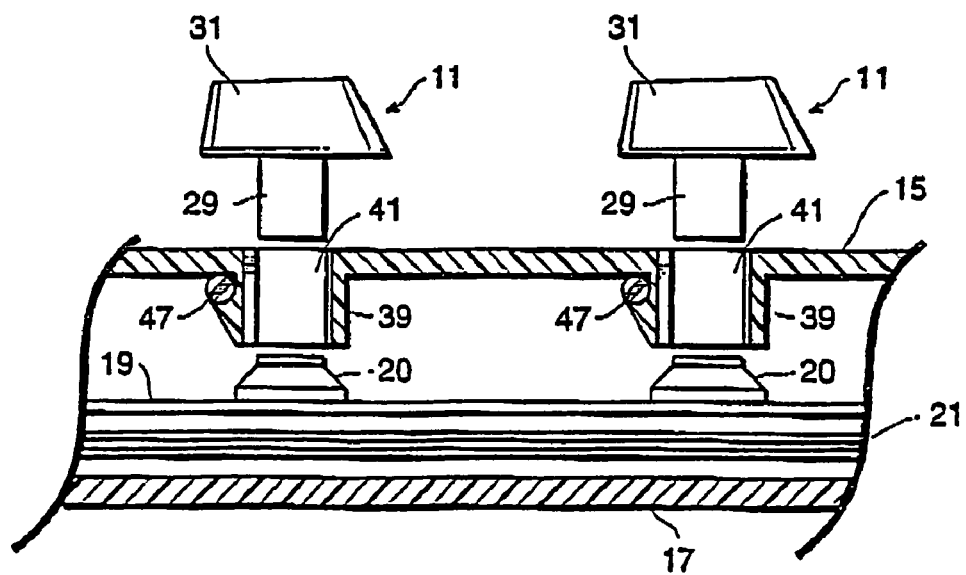
FIG. 12 is a side cut-away exploded view of the keyboard shown in FIG. 11 in which light pipes are positioned adjacent to two rows of downwardly projecting clamshell sidewalls for transmitting light upon the sides of a plurality of key shafts for illuminating a plurality of key members.
Figure 13:
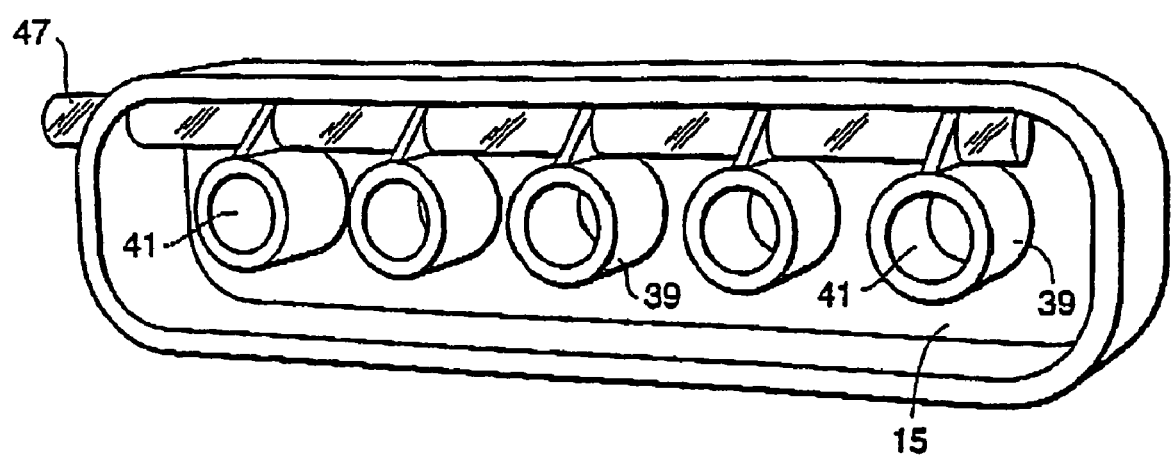
FIG. 13 is a top perspective view of a top clamshell member in which a light pipe is embedded therein for transmitting light adjacently upon the sides of a plurality of keys for illuminating a plurality of key members.

For example, as shown in FIGS. 11–13, a light pipe 47 is positioned adjacent to a plurality of key members 11, so that a single light pipe can be used to illuminate a plurality of key members. Again, the light pipe 47 may be constructed of various materials in various shapes as can be determined by those skilled in the art. As shown in the figures, the light pipe 47 is attached to, or formed integral with, the upper clamshell member 15, adjacent the hollow projections 39. Preferably, the hollow projections 39 are constructed to include a portion that is at least partially translucent to allow light channeled by the light pipe 47 to channel into the bores 41 formed by the hollow projections 39 and onto the key shafts 29 of the key members 11. Alternatively, the hollow projections 39 have openings (not shown) in their sidewalls to allow light to project laterally from the light pipe 47 through the openings and onto the exterior of the key shafts 29 of the key members 11. The light channeled by the light pipe 47 strikes the sides of the key shafts 29 and is transmitted through the translucent material of the key member 11 to be projected from the top of the key cap 31 in the form of an alphanumeric character 35. Where the keyboard is constructed with an elastic diaphragm 19 having elastic projections 20 which project into the bores 41 formed by the hollow projections, preferably, the elastic projections 20 are also constructed of a translucent material so that the elastic projections do not impede the transmission of light from the light pipe 47 to the key members 11 prior to depression of the key members.

In another preferred embodiment of the invention, the light source is constructed as a substantially planar sheet 49 affixed below the bottom surface of the light channeling membrane 37. Luminescent planar sheets can be constructed by those skilled in the art using various technologies. For example, the luminescent planar sheets may be constructed of an electroluminescent lamp, an Organic Light Emitting Device (OLED), a Transparent Organic Light Emitting Device (TOLED), or a Flexible Organic Light Emitting Device (FOLED). Alternatively, the luminescent sheet may be constructed of a substantially translucent material which acts as a "light pipe" connected to an independent light source such as a fiberoptic light source, light emitting diodes, or light emitting crystals. In still an additional embodiment, the luminescent sheet is constructed of a plurality of fiberoptic strands laid side-by-side to form a sheet which connects to an independent light source such as light emitting diodes or light emitting crystals. The translucent material channels the light from the light source to the keys, or to a separate light channeling membrane 37 to illuminate the keys.

As shown in FIGS. 6 and 7, in one of the preferred embodiments, the planar sheet 49 is constructed with a plurality of holes 50 which underlie the conical projections 39 and longitudinally extending bores 41 of the light channeling membrane 37. A shown in FIG. 7, this construction permits the key shafts 29 of the key members 11 to telescope downwardly into the bores 41 and through the holes 50 of the luminescent sheet 49. Though the key members 11 are normally biased upwardly by the elastomeric projections 20 of the diaphragm 19, downward depression of the key members 11 by fingertip pressure on the key member's upper surfaces 33 causes the key shafts 29 to project downwardly through bores 41 and holes 50 until the bottom extremity of the key member 11 forces the diaphragm projections 20 to forcibly close electrical switches 55 in the circuit board 21.

Figure 8:
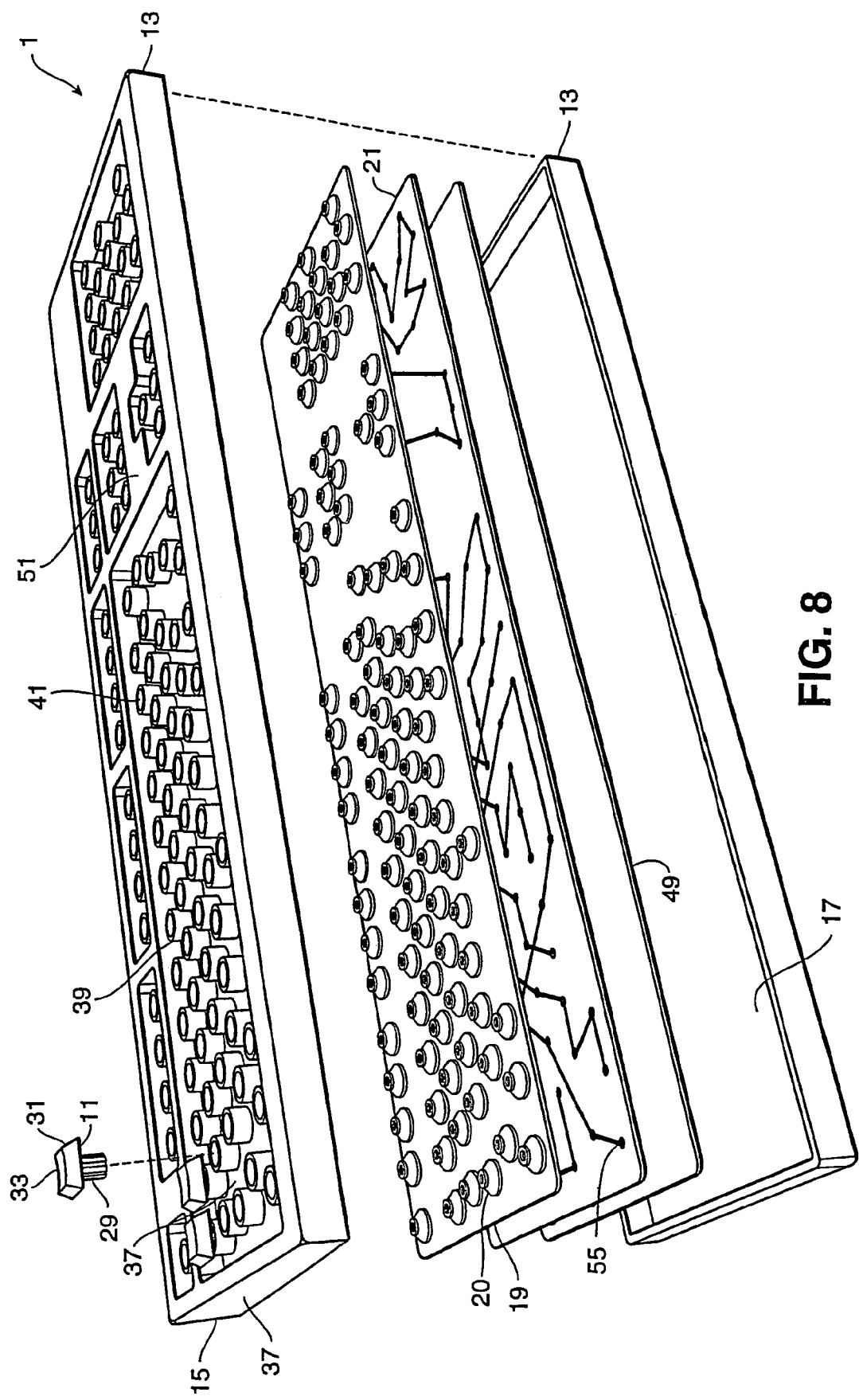
FIG. 8 is a cutaway view of a preferred keyboard having illuminated keys of the present invention wherein the light source is a planar illuminating sheet underlying the diaphragm and circuit board of the keyboard.
Figure 9:
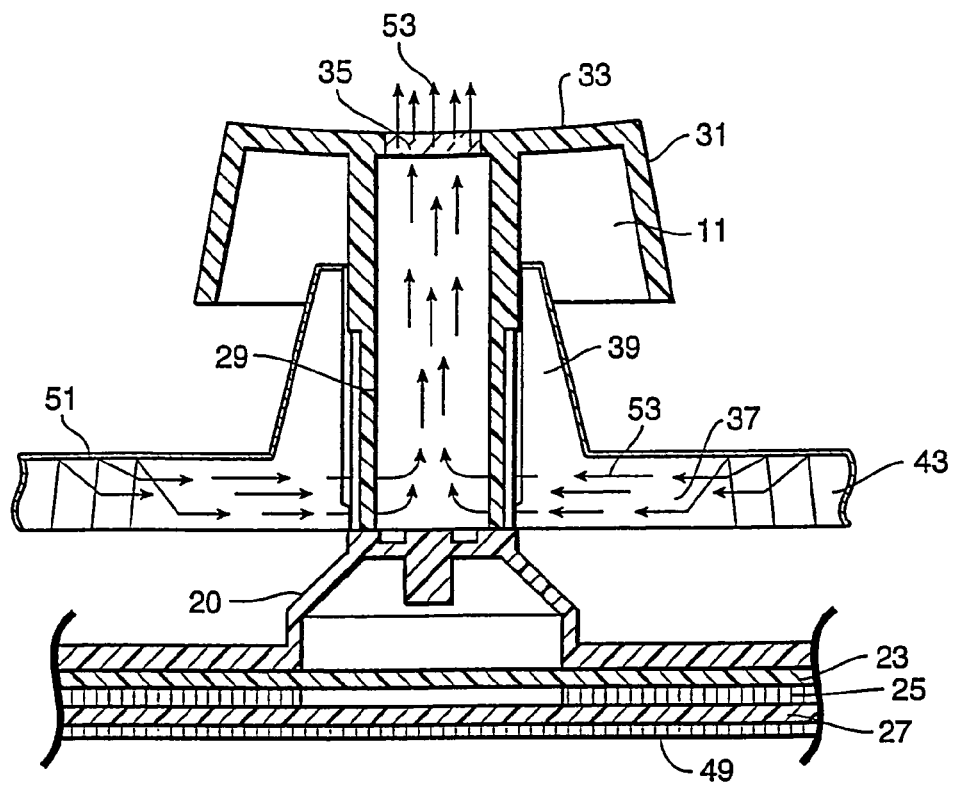
FIG. 9 is an exploded view of the keyboard having illuminated keys of the present invention in which the light source is a planar illuminating sheet underlying the diaphragm and the circuit board of the keyboard.

With reference to FIGS. 8 and 9, in an additional preferred embodiment, the planar luminescent sheet 49 underlies both the diaphragm 19 and the circuit board 21. The diaphragm and circuit board are constructed to be substantially translucent, and light emitted upwardly by the luminescent planar sheet 49 is transmitted through the translucent diaphragm sheet and circuit board to the bottom of the key members 11. Because the key members are also manufactured of a translucent material, the light is then channeled through the key members' shafts 29 to be emitted from the key's upper surface 33 in the form of a symbol 35. For reasons of cost, a presently preferred planar luminescent sheet for use with this embodiment is constructed of a plurality of fiberoptic strands laid side-by-side to form a sheet. The fiber optic sheet is connected to an independent light source such as light emitting diodes or light emitting crystals.

With reference also to FIGS. 6 and 7, this embodiment has the benefit of not requiring that the upper clamshell member 15 of the keyboard be manufactured of a translucent material so as to function as a light channeling membrane 37. Instead, the translucent circuit board 21 and diaphragm 19 operate as a light channeling membrane by communicating light emitted by the planar sheet 49 to the bottom extremities of the key members 11. Light is then emitted from the upper surfaces 33 of the key members. Also with reference to FIGS. 6 and 7, this embodiment also has the benefit of not requiring that the luminescent planar sheet 49 be formed with holes 50 underlying each of the key members for permitting the shafts 29 of the key members to project downwardly through the holes so as to engage the diaphragm 19 and circuit board 21. Instead, the keyboard is constructed with the luminescent planar sheet positioned so as to avoid contact with the moving members of the keyboard, the key members and diaphragm. For this embodiment of the present invention, it is preferred that the luminescent planar sheet not include any holes so that the luminescent planar sheet can provide a maximum of luminosity to the key members.

Figure 10:
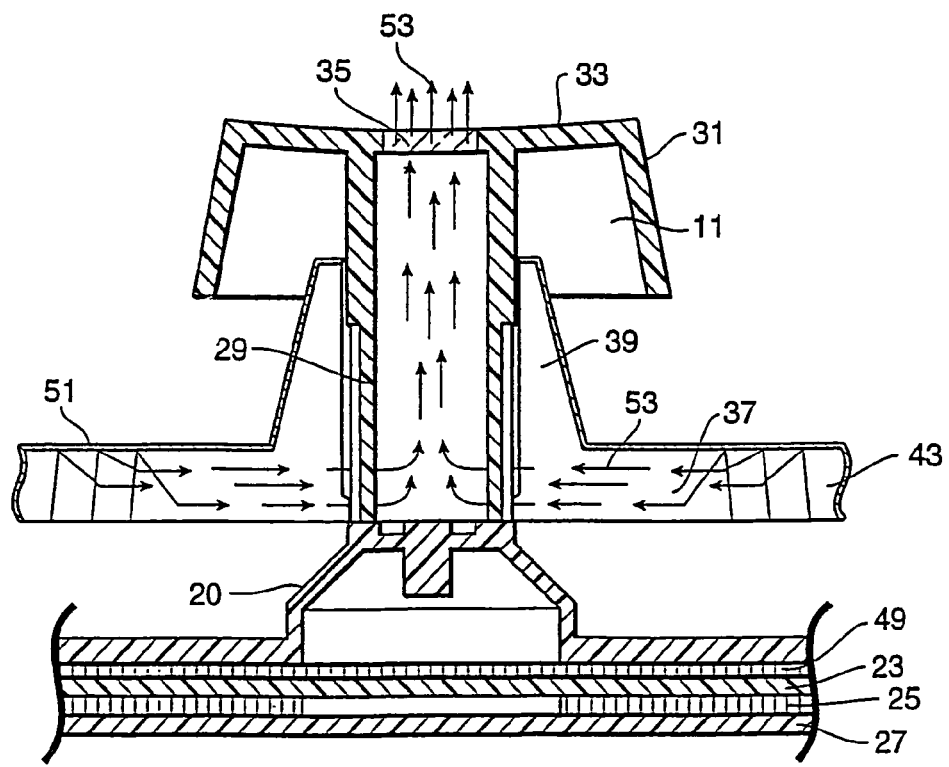
FIG. 10 is an exploded view of the keyboard having illuminated keys of the present invention in which the light source is a planar illuminating sheet positioned between the elastic diaphragm and circuit board of the keyboard.

With reference also to FIG. 10, in an additional embodiment of the present invention, the light source 47 is positioned between the diaphragm 19 and circuit board 21. The light source is again constructed in planar form having at least its top side providing luminescence. The elastic diaphragm 19 is manufactured of a translucent material so that light emitted upwardly from the light source, in the form of a luminescent sheet 49, shines through the diaphragm projections 20 and upon the bottoms of the key member shafts 11. Preferably, for this embodiment, the upper clamshell member 15 of the keyboard is also preferably manufactured of a translucent material so that light emitted from the luminescent sheet strikes the underside of the upper clamshell member 15 and is channeled to the sidewalls of the key members. For this embodiment, the elastic diaphragm and upper clamshell member cooperate to function as a light channeling membrane, transmitting light from the light source to the key members 11. The light is then channeled through the key members to be transmitted from the tops 33 of the key caps 31.

This embodiment has the advantage over the previous embodiment in that light emitted from the light source is not transmitted through the circuit board 21 prior to striking the outer surfaces of the key members 11 which could cause diminished luminescence from the key members due to light reflection, refraction or absorption caused by the optical properties of the circuit board. However, this embodiment has the disadvantage over the prior described embodiment in that the light source is positioned between the key members and the circuit board. This construction requires that the light source be compressed with each actuation of the keyboard key members unless the light source is constructed with holes to permit the key members to engage the circuit board directly which would also diminish the amount of light emitted from the key members. Though troublesome, this disadvantage can be overcome using the above described material from MKS, Inc. which it is believed can withstand the cyclic compression stemming from the actuations of the key members.

Figure 14:
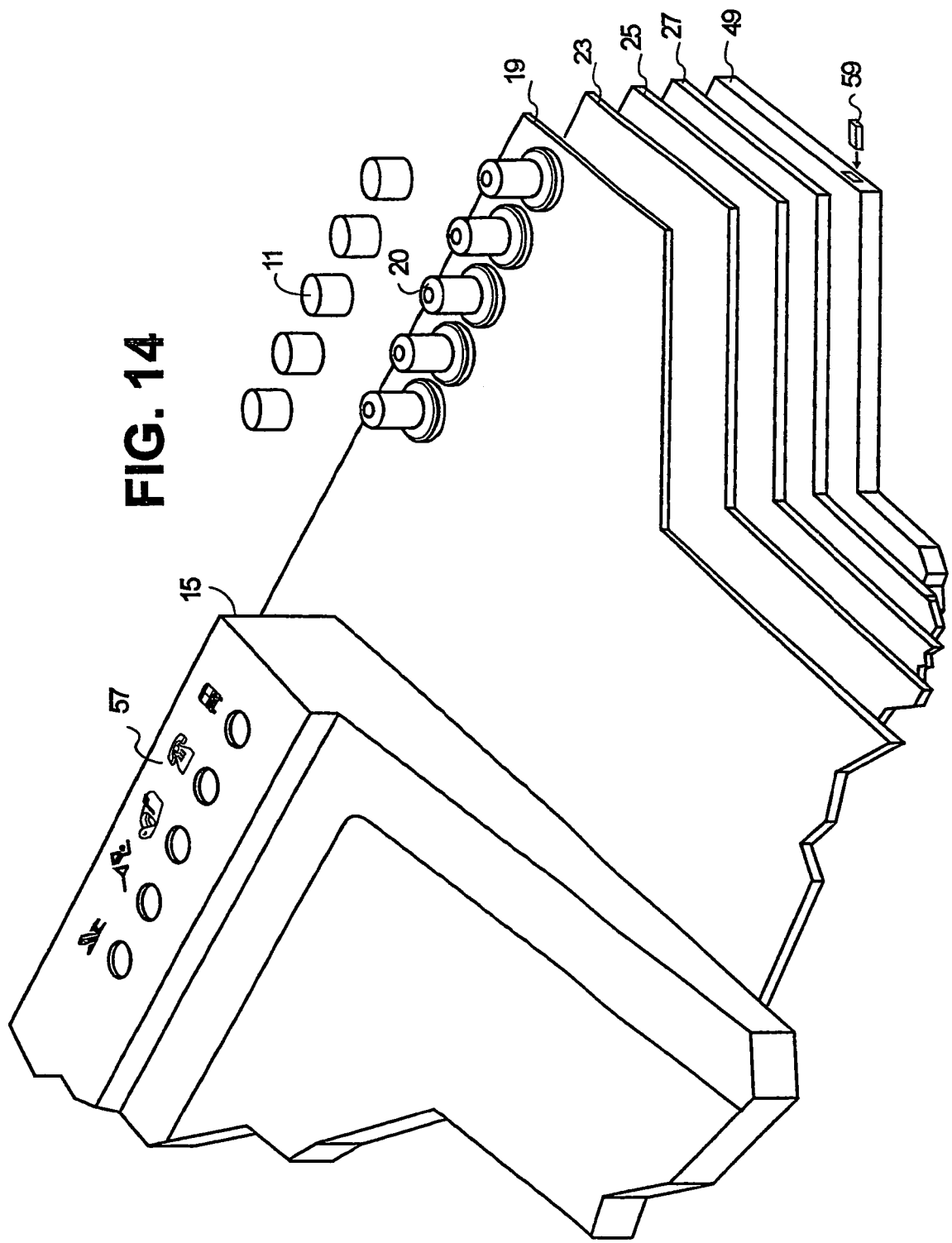
FIG. 14 is an exploded view of a keyboard having illuminated indicia in which the light source is a planar illuminating sheet positioned below the elastic diaphragm and circuit board of the keyboard.
Figure 15:
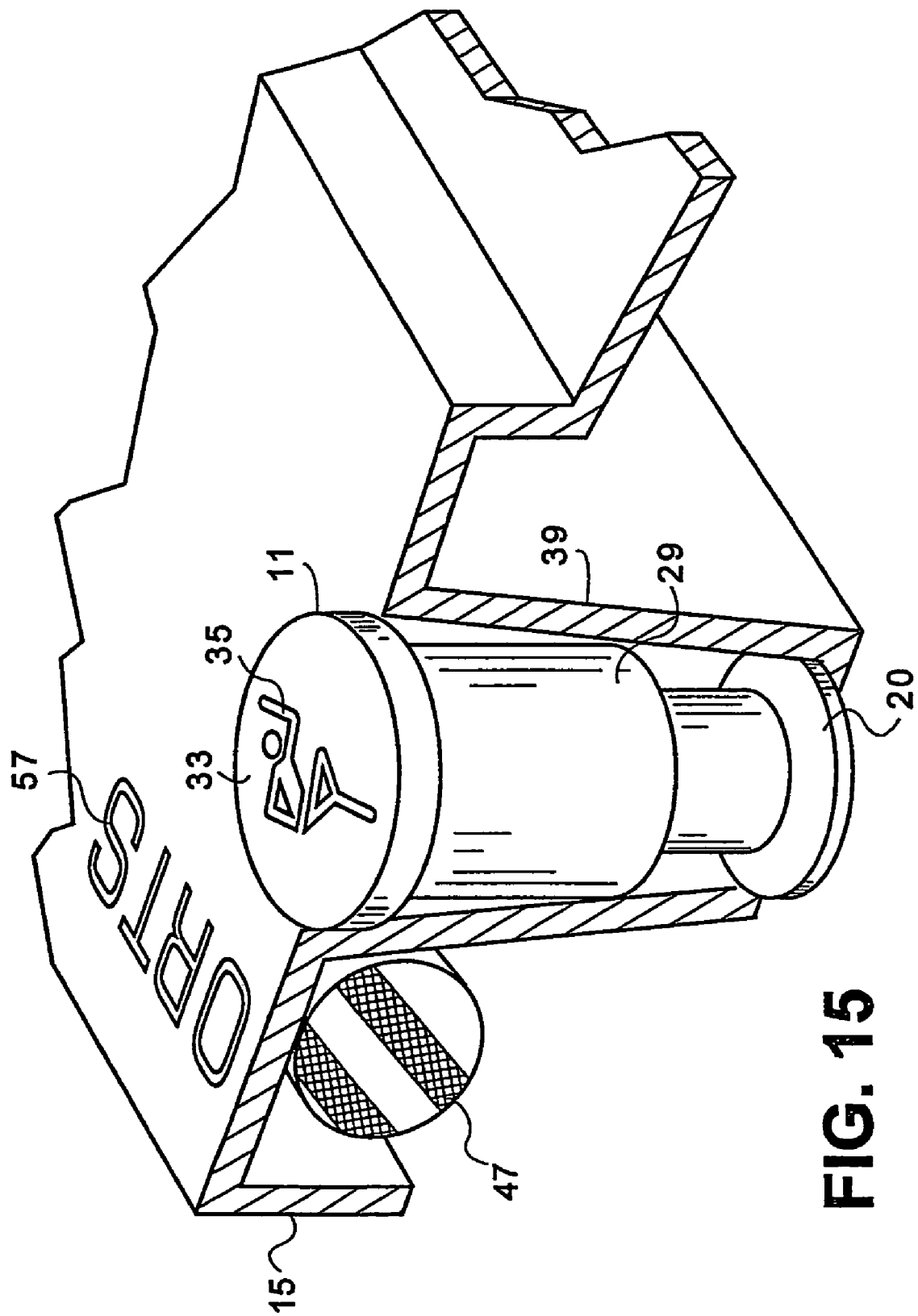
FIG. 15 is a cross-sectional view of a keyboard having illuminated indicia and illuminated key members whereby a light source is a light pipe positioned lateral to the key member and below the keyboard's upper clamshell member.

With reference to FIGS. 14 and 15, in still an additional embodiment of the invention, the keyboard's upper clamshell member includes illuminated indicia for identifying the function of one or more key members. Sometimes key members are too small for including symbols which are sufficiently large so as to be easily read by a keyboard operator. This is particularly true of the "function" keys which are often found at the top of a typical keyboard. These function keys include the traditional "F1–F12" keys, as well as "insert", "home", "delete", "end", "page up" and "page down" keys. Further, more and more keyboards are constructed to include "internet" keys which provide access to particular websites, and audio and video keys which control a computer's audio and video functions. In addition, keyboards are being constructed with more and more function keys, and the invention is not intended to be limited to the use of the function keys identified herein.

Unfortunately, these "function" keys are often constructed smaller than the "qwerty" letter keys. Due to their small size, it is often difficult to incorporate a symbol, or indicia, on the key members which can be easily read by the keyboard operator. Moreover, incorporating an illuminated symbol on these keys in accordance with FIGS. 4–13 can make the symbol even more difficult to read.

In order to overcome these disadvantages, in a preferred embodiment of the invention, the keyboard's upper clamshell member is constructed to include a region that is partially translucent. This region, constructed of a substantially translucent material, communicates light rays through the keyboard to display indicia indicating functions of one or more members. In similar fashion to the illumination of symbols shown in FIGS. 3 and 11, the clamshell indicia may be illuminated by light channeling through the upper clamshell to be emitted in the form of the indicia wherein an opaque coating or material is used to restrict the light to the shape of the indicia 57. Alternatively, larger portions of the clamshell member 15 can be illuminated while the symbol 57 remains opaque, depending on whether the symbol is intended to be illuminated as a positive or negative representation.

Moreover, the clamshell indicia may be illuminated using an illuminating planar sheet as shown in FIGS. 7–10, or the clamshell indicia may be illuminated using a light pipe as shown in FIGS. 11–13. For example, as shown in FIG. 14, in a first embodiment, the keyboard includes a diaphragm 19, first and second printed wiring layers 23 and 27, an insulator or dielectric layer 25, and a light channeling structure constructed as a substantially planar sheet 49. A light source 59, such as an LED, is provided for emitting light upwardly from the planar sheet 49, through the printed circuit board and elastic diaphragm so as to strike the underside of the upper clamshell member 15. The upper clamshell member includes translucent regions 57 to provide illuminated indicia for identifying the functions of the adjacent key members 11.

In an additional embodiment, a light pipe 47 is utilized to illuminate the clamshell indicia 57 and key members. As shown in FIG. 15, the indica 57 reading "ORTS" is a portion of the complete word "SPORTS" for identifying the internet function of a key member 11 which provides access to an internet website dedicated to sports. The keyboard includes a clamshell member 15, illuminated indicia 57, key members 11, illuminated symbols 35, a biasing projection 20 and a light pipe 47. The light pipe 47 is attached to, or formed integral with, the upper clamshell member 15, adjacent to the hollow projections 39. The surface of the light pipe 47 is scratched or otherwise flawed so as to reflect light rays from the interior of the light pipe 47 to be emitted from the light pipe's 47 exterior surface. Light is emitted upwardly so as to illuminate the translucent regions 57 of the upper clamshell member.

With reference also to FIGS. 11–15, preferably light is also emitted laterally from the light pipe so as to strike the hollow projections 39. Preferably, the hollow projections 39 are constructed to include a portion that is at least partially translucent to allow light channeled by the light pipe 47 to project into the bores onto the key shafts 29 of the key members 11. Alternatively, the hollow projections 39 have openings (not shown) in their sidewalls to allow light to project laterally from the light pipe 47 through the openings and onto the exterior of the key shafts 29 of the key members 11. The light channeled by the light pipe 47 strikes the sides of the key shafts 29 and is transmitted through the translucent material of the key member 11 to be projected from the top of the key cap 31 in the form of a symbol 35.

The keyboard including illuminated clamshell indicia has been described primarily for use in connection with illuminating and identifying function keys. However, the invention is not intended to be limited thereto. For example, a keyboard having an upper clamshell member including illuminated indicia for identifying the "qwerty" key members is also within the scope of the invention.

Preferably, the key members are also constructed, at least partially, of a translucent material so that the key members illuminate. The key members may be constructed in various ways. For example, the keys may be substantially translucent with minimal coating except for symbols, such as letters on the keys, to provide a highly luminous key. However, preferably the keys are constructed in opposite manner in which the keys are substantially covered by an opaque material except for the symbols to provide key members including illuminated symbols for identifying their function. Where the key members are too small for readable markings, preferably the key members include an illuminated region, such as in the shape of a circle or star, for providing an indication as to the location of the key members.

In a preferred embodiment of the invention, translucent portions of the keyboard are coated on their exterior surfaces with a reflective opaque coating where light is not intended to be emitted. More particularly, it is preferred that the key members are coated with a paint such as light grey, white, silver, metallic silver, metallic gold, and other shiny metallic colors which substantially reflects visible light. Where the upper clamshell member is constructed of a translucent material, it is also preferred that the upper clamshell be coated with a material for reflecting visible light and reducing light absorption.

Though not shown in the figures, in still an additional preferred embodiment, the key caps and clamshell member include two layers of paint or the like. The initial first coating is a highly reflective material to reduce visible light absorption and reflect the light back into the translucent material until transmitted from the key caps. Meanwhile, a second coating of an alternative paint or other material is applied over the first coating. The second coating may also be reflective of visible light. However, it is preferred that the second coating reflects less visible light than the first coating, and preferably the second coating is a substantially non-reflective coating or color such as dark grey, black or blue. The keys can be made by sequentially application of coatings to translucent key members. The symbols, such as letters, are then formed on top of the key caps by using a laser or the like to cut away the excess material of both the first and second coatings to form the desired symbols. Key members are thus produced which include an enhanced contrast between the luminescent symbol and the substantially non-reflective regions of the key cap to provide enhanced readability for the keyboard user.

The present invention provides for an inexpensive and simple way to manufacture keyboards including illuminated indicia and keys having illuminated upper surfaces. The keyboard of the present invention is particularly suitable for use with computers and particularly with laptop computers, though it is not intended that the present invention be limited thereto. While several particular forms of the invention have been illustrated and described, it will be apparent that various modifications can be made without departing from the spirit and scope of the invention. Accordingly, it is not intended that the invention be limited except by the following claims.

I claim:

1. A lighted computer keyboard comprising:
   a keyboard housing;
   a plurality of key members constructed of a substantially hard non-deformable material, said key members being depressably positioned within said keyboard housing;
   a substantially translucent elastic diaphragm underlying said key members for biasing said key members in an upward direction;
   a circuit board underlying said plurality of key members and said elastic diaphragm, said circuit board being operational to produce signals in response to depression of said key members; and
   a luminescent planar sheet for producing light, said luminescent planar sheet underlying said key members and said elastic diaphragm, and being positioned between said elastic diaphragm and said circuit board, said luminescent planar sheet being optically connected to said key members so as to permit the transmission of light to at least some of said plurality of key members.

2. The lighted computer keyboard of claim 1 wherein said luminescent planar sheet is an electro-luminescent panel lamp.

3. The lighted computer keyboard of claim 1 wherein said luminescent planar sheet includes fiberoptic cables.

4. The lighted computer keyboard of claim 1 wherein said luminescent planar sheet includes LEDs or LECs.

5. The lighted computer keyboard of claim 1 wherein said luminescent planar sheet is constructed as a planar light pipe made of translucent plastic.

\* \* \* \* \*